United States Patent
Fagadar-Cosma et al.

(10) Patent No.: US 9,762,856 B2
(45) Date of Patent: Sep. 12, 2017

(54) VIDEOCONFERENCING SERVER WITH CAMERA SHAKE DETECTION

(71) Applicant: Alcatel Lucent, Boulogne Billancourt (FR)

(72) Inventors: Mihai Fagadar-Cosma, Antwerp (BE); Paul Henrys D'Aubigny D'Esmyards, Borgerhout (BE)

(73) Assignee: Alcatel Lucent, Boulogne-Billancourt (FR)

( * ) Notice: Subject to any disclaimer, the term of this patent is extended or adjusted under 35 U.S.C. 154(b) by 0 days.

(21) Appl. No.: 14/648,057

(22) PCT Filed: Nov. 25, 2013

(86) PCT No.: PCT/EP2013/074528
§ 371 (c)(1),
(2) Date: May 28, 2015

(87) PCT Pub. No.: WO2014/082941
PCT Pub. Date: Jun. 5, 2014

(65) Prior Publication Data
US 2015/0304606 A1   Oct. 22, 2015

(30) Foreign Application Priority Data
Nov. 29, 2012   (EP) ..................... 12290418

(51) Int. Cl.
*H04N 5/235*   (2006.01)
*H04N 7/15*   (2006.01)
(Continued)

(52) U.S. Cl.
CPC ............. *H04N 7/15* (2013.01); *H04L 65/605* (2013.01); *H04L 65/80* (2013.01);
(Continued)

(58) Field of Classification Search
USPC ....................................................... 348/14.08
See application file for complete search history.

(56) References Cited

U.S. PATENT DOCUMENTS

| 8,345,921 B1 * | 1/2013 | Frome | G06K 9/72 |
| | | | 382/103 |
| 2011/0096137 A1 * | 4/2011 | Baker | H04N 7/147 |
| | | | 348/14.08 |

(Continued)

FOREIGN PATENT DOCUMENTS

| CN | 101189870 A | 5/2008 |
| CN | 101278551 A | 10/2008 |

(Continued)

OTHER PUBLICATIONS

Chen Wu et al., "Visual Framing Feedback for Desktop Video Conferencing," 18th IEEE International Conference on Image Processing, pp. 2961-2964, XP032080281, Sep. 11, 2011.

(Continued)

*Primary Examiner* — Amal Zenati
(74) *Attorney, Agent, or Firm* — Fay Sharpe, LLP

(57) ABSTRACT

A video conferencing server (100) receives and combines video streams captured by cameras of plural video clients (101) and generates immersive video streams (124, 125) for delivery to and play-out by these video clients (101). A cut-out module (102) in the video conferencing server (100) generates a foreground mask (122) for a video frame (121) received from a conferencing client (101). A camera shake detector (103) determines a displacement vector (123) for a subset of features in the video frame (121). The displacement vector (123) represents a two-dimensional motion of the subset of features between a background mask and a previous background mask for a previous video frame received from the same conferencing client (101). A camera shake correcting module (102, 104) applies a displacement (Continued)

opposite to the displacement vector (123) to the foreground mask (122) before use thereof in the immersive video streams (124, 125) for conferencing clients (101), and a signalling unit (104) generates a shake indication (311, 312) into the immersive video stream (124) delivered to the conferencing client (101) whose camera is shaking.

9 Claims, 3 Drawing Sheets

(51) Int. Cl.
- *H04N 7/14* (2006.01)
- *H04L 29/06* (2006.01)
- *H04N 5/232* (2006.01)

(52) U.S. Cl.
CPC ..... *H04N 5/23254* (2013.01); *H04N 5/23267* (2013.01); *H04N 7/142* (2013.01); *H04N 7/147* (2013.01)

(56) References Cited

U.S. PATENT DOCUMENTS

2011/0096140 A1  4/2011  Samadani et al.
2011/0310217 A1  12/2011  Lee et al.

FOREIGN PATENT DOCUMENTS

| CN | 102693545 A | 9/2012 |
| EP | 2 525 573 A1 | 11/2012 |
| JP | H11-289524 A | 10/1999 |
| JP | 2004-206320 A | 7/2004 |
| JP | 4448177 B2 | 4/2010 |
| JP | 2011-160423 A | 8/2011 |

OTHER PUBLICATIONS

S. C. Chan et al., "A Movable Image-Based Rendering System and its Application to Multiview Audio-Visual Conferencing," IEEE 2010 International Symposium on Communications and Information Technologies, pp. 1142-1145, XP031833274, Oct. 26, 2010.

Ki-Sang Kim et al., "Real Time Face Tracking with Pyramidal Lucas-Kanade Feature Tracker," Computational Science and its Applications, pp. 1074-1082, XP019068301, Aug. 26, 2007.

International Search Report for PCT/EP2013/074528 dated Jan. 7, 2014.

\* cited by examiner

VIDEOCONFERENCING SERVER WITH CAMERA SHAKE DETECTION

FIELD OF THE INVENTION

The present invention generally relates to immersive video conferencing, i.e. video conferencing wherein the video streams from plural clients participating in a conference are processed and combined to establish virtual presence of all participants into a single conference room. Typically, each video client generates a video stream through its camera. Through foreground extraction, background and foreground are isolated in the different video streams, and the foreground images of the different clients are combined to generate immersive video streams for play-out by each client. Typically, the immersive video-streams are individualized and create for each user a look-and-sound environment as if all participants share a single conference room or table seen from the viewpoint of the user for which the immersive stream is individualized. In the immersive video stream generated for an individual user, that user's shadow may be integrated as if the virtual conference room or table is viewed from a viewpoint behind that user. The present invention in particular concerns detecting and compensating the camera shake or camera jitter phenomenon in order to improve such immersive video conference systems.

BACKGROUND OF THE INVENTION

The problem of camera shake or camera jitter can be alleviated through the use of dedicated video capture devices at the client's side, like for instance Microsoft Video Kinect, or systems based on Time-Of-Flight (TOF) cameras. Such systems however are not portable and they involve a dedicated set-up procedure that does not enable ubiquitous access, i.e. access at any time from any location, to immersive videoconferencing.

Through the use of mobile devices, ubiquitous access to video conferencing has become possible. Through the increased use of mobile devices in video conferencing however, the camera shake or camera jitter problem is encountered which generally degrades the output quality of the foreground extraction process and consequently also the quality of the immersive video streams that are generated from the extracted foreground images. Reliable detection of camera shake in order to enable taking appropriate corrective and/or preventive measures improving the quality of immersive video hence is desirable.

One category of solutions makes use of device specific hardware such as accelerometers present in certain mobile phones, tablet-PCs, etc. in order to detect camera shake. These solutions however rely on the presence of dedicated hardware and are therefore not device-agnostic. Further, these solutions leave a range of portable devices that is typically not equipped with such hardware, like for instance laptops, uncovered.

Another category of solutions relies on software algorithms that detect and correct camera shake in the client device capturing the images. Examples of such algorithms are for instance described in the article "Using Optical Flow for Stabilizing Image Sequences" from the author P. O'Donovan, and the article "Fixation as a Mechanism for Stabilization of Short Image Sequences" from the authors K. Pauwels, M. Lappe, and M. M. Van Hulle. Since these algorithms perform video stream processing at the client side, these solutions are not device-agnostic and therefore cannot guarantee a ubiquitous, coherent video conference experience across all devices. Moreover, these algorithms typically occupy substantial processing power and memory resources in the client devices of the conference participants.

It is an objective of the present invention to provide a method and tool for immersive video conferencing that resolves the above-mentioned disadvantages of existing solutions. More particularly, it is an objective of the present invention to disclose an immersive video conferencing solution that allows to improve the overall quality of immersive video conferencing by detecting, signalling and correcting camera shake in a manner that is agnostic to the client devices used by the conference participants, and that can be implemented with limited requirements in terms of usage of processing power and memory.

SUMMARY OF THE INVENTION

According to the present invention, the above defined objectives are realized by a video conferencing server for immersive video conferencing as defined by claim 1, the video conferencing server being adapted to receive and combine video streams captured by cameras of plural video clients and to generate immersive video streams for delivery to and play-out by the plural video clients, wherein the video conferencing server comprises:
a cut-out module adapted to generate a foreground mask for a video frame received from a conferencing client;
a camera shake detector adapted to determine a displacement vector for a subset of features in said video frame, the displacement vector representing a two-dimensional motion of the subset of features between the background mask obtained by inverting the foreground mask and a previous background mask generated for a previous video frame received from the conferencing client;
a camera shake correcting module adapted to apply a displacement opposite to the displacement vector to the foreground mask before use thereof in the immersive video streams to thereby correct camera shake effects of the conferencing client; and
a signalling unit adapted to generate a shake indication into an immersive video stream delivered to the conferencing client.

Thus, the present invention is server-side implemented, ensuring its is agnostic to the client devices that are used to capture the video streams. It can for instance be implemented as a software program running in a processor in a cloud environment, i.e. a remote storage and processing environment that is operated and maintained by a third party, different from the parties involved in the video conference. The present invention further takes advantage of technology that is available in an immersive video conference system, i.e. the foreground extraction. The present invention indeed relies upon the cut-out module that isolates background and foreground in the video streams received from clients. The present invention then computes global motion in the background of a video stream by quantifying the displacement of a subset of features in the background. In absence of camera shake, the background should be stable and the displacement of features in the background should be near zero. If the displacement on the contrary has a magnitude that exceeds a certain threshold, the present invention assumes that a camera shake phenomenon is detected. The server shall then signal the camera shake to the client device whose camera has been shaking in order to enable the user thereof to take preventive measures. The system further shall take corrective measures by applying a displacement to the foreground images of the video stream wherein the shake phenomenon has been detected, before these foreground images are used in the immersive video streams that are produced for the other clients. In summary, the invention makes users aware of unwanted camera shake phenomena at their end and it takes corrective measures against the detected shake phenomena in the extracted foreground images. This way, the invention contributes significantly to the quality of immersive video conferencing, irrespective of the type of client devices used to capture the images and without negative impact on the usage of processing and storage resources in such client devices.

In a preferred embodiment of the video conferencing server according to the present invention, defined by claim 2, the camera shake detector comprises:
  a video stream processor for selecting a set of features in the video frame and the previous video frame;
  filtering logic for filtering the set of features to obtain a subset of features that belongs to the background mask of the video frame and to the previous background mask of the previous frame; and
  processing logic for computing a sparse optic flow for the subset of features through the Pyramidal Lukas-Kanade algorithm.

Indeed, the camera shake detector according to the present invention selects a subset of features that belongs to the image background and computes the sparse optic flow according to the Pyramidal Lukas-Kanade (LK) algorithm, i.e. the displacement of these features from one frame to another. This results in a set of velocity vectors for the subset of features from which a global displacement vector, i.e. a two-dimensional motion that quantifies the camera shake between the two frames, can be calculated through various statistical methods.

According to a further aspect of the video conferencing server according to the present invention, defined by claim 3, the camera shake detector comprises:
  statistical logic for calculating from the sparse optical flow for the subset of features through statistical averaging a motion magnitude and motion direction that form the displacement vector.

Indeed, through averaging the velocity vectors computed for the subset of features in the background, a magnitude and orientation or direction can be determined that quantify the camera shake. Several averaging techniques can be applied, such as the mean value, the median, a weighted sum, an extremum, etc.

According to an optional aspect of the video conferencing server according to the invention, defined by claim 4, the camera shake detector further comprises:
  processing logic configured to compare for each feature in the subset of features the magnitude of the sparse optical flow to a predetermined threshold, and configured to discard the feature from calculating the displacement vector when the magnitude of the sparse optical flow is below the predetermined threshold.

Thus, the camera shake detector according to the present invention preferably filters the features that will be used to quantify the camera shake magnitude and dominant direction. If the displacement of a feature remains below a certain threshold in magnitude, it is considered noise and therefore eliminated from further computations since it will likely induce errors into the estimation of the global displacement vector. Thus, by filtering the background features used for detecting camera shake, the accuracy and reliability is improved.

In a preferred embodiment of the video conferencing server according to the present invention, defined by claim 5, the camera shake detector further comprises:
  processing logic configured to assign each feature in the subset of features according to a direction of its sparse optical flow to a first bin out of a first set of n histogram bins each covering a range of 360 degrees/n and to a second bin out of a second set of n histogram bins each covering a range of 360 degrees/n, n being a positive integer value, and the second set of n bins being rotated over 180 degrees/n with respect to the first set of n bins;
  processing logic configured to select a dominant bin amongst the first set of n bins and the second set of n bins, containing the highest amount of features from the subset of features; and
  processing logic configured to discard all features that do not belong to the dominant bin from calculating the displacement vector.

Indeed, in order to determine the dominant direction of the camera shake, two histograms of n bins may be considered. In these bins the features of the subset are grouped according to the orientation of their displacement. Each bin covers a range of 360°/n. The first histogram shall for instance start at 0°. The second histogram of n bins shall be rotated over 180°/n with respect to the first bin. The bin containing the highest number of features amongst the two histograms is selected. The features that do not belong to this bin are discarded from the dominant direction calculation. The second histogram is necessary to ensure that the dominant direction shall not coincide with the border between two bins. Again, the mechanism to filter the features that are used for the dominant direction computation based on two histograms of bins, increases the accuracy and reliability of the present invention.

In addition to a video conferencing server as defined by claim 1, the present invention also concerns a corresponding method for camera shake detection in a video conferencing server as defined by claim 6, the video conferencing server being adapted to receive and combine video streams captured by cameras of plural video clients and to generate immersive video streams for delivery to and play-out by the plural video clients, wherein the method comprises:
  generating a foreground mask for a video frame received from a conferencing client;
  determining a displacement vector for a subset of features in the video frame, the displacement vector representing a two-dimensional motion of the subset of features between the background mask obtained by inverting the foreground mask and a previous background mask generated for a previous video frame received from the conferencing client;
  applying a displacement opposite to the displacement vector to the foreground mask before use thereof in the immersive video streams to thereby correct camera shake effects of said conferencing client; and
  generating a shake indication into an immersive video stream delivered to the conferencing client.

The present invention also concerns a corresponding data processing system as defined by claim 7, comprising means for carrying out the method.

The invention further concerns a corresponding computer program as defined by claim 8, comprising software code adapted to perform the method, and a computer readable storage medium as defined by claim 9, comprising the computer program.

DETAILED DESCRIPTION OF EMBODIMENT(S)

Figure 1:
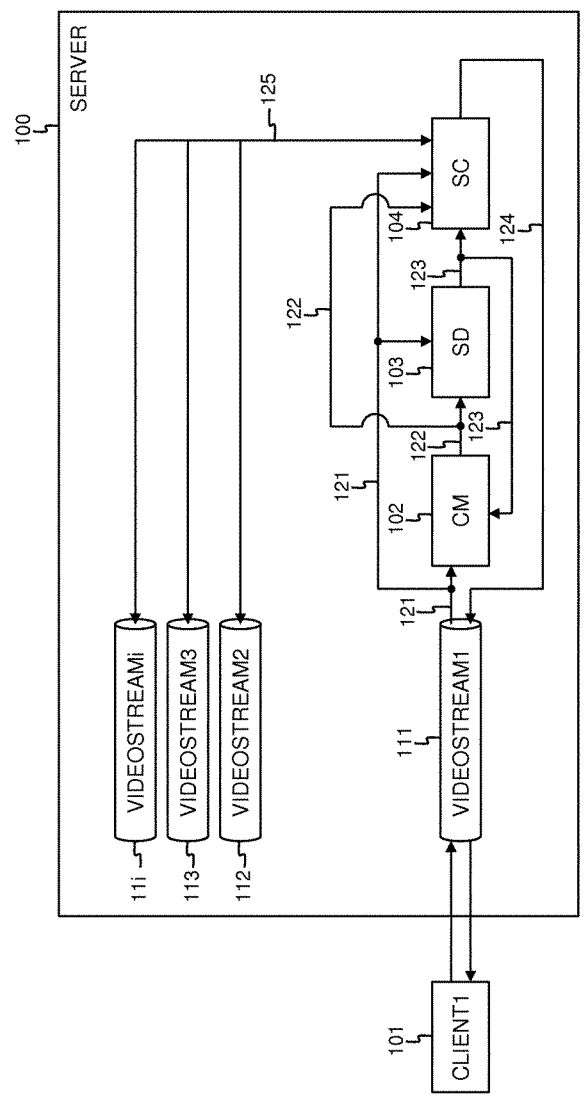
FIG. 1 is a functional block scheme of an embodiment of the video conferencing server 100 according to the present invention.

FIG. 1 shows a video client, 101 or CLIENT1, connected to an immersive video conferencing server 100. The immersive video conferencing server 100 may for instance be a software application running in a cloud environment, i.e. using processing and memory resources that are hosted and maintained by a third party, different from the clients that use the system.

The immersive video conferencing server 100 comprises video stream transceiving channels, 111 or VIDEOSTREAM1, 112 or VIDEOSTREAM2, 113 or VIDEOSTREAM3, 11i or VIDEOSTREAMi, a cut-out module 102 or CM, a shake detector 103 or SD, and a scene composer 104 or SC. The cut-out module 102, shake detector 103 and scene composer 104 jointly form the video processing pipeline of the immersive video conference platform.

The video stream transceiving channel 111 receives a video stream captured by a camera integrated in or connected to the video conference client 101. The video stream transceiving channel 111 feeds the video stream 121 to the cut-out module 102, the shake detector 103 and the scene composer 104. The cut-out module 102 separates the foreground from the background in each video frame using state of the art foreground extraction technology. The foreground mask 122 is supplied to the shake detector 103 which represents the key element in the current invention. The shake detector 103 uses the foreground mask 122 received from the cut-out module 102 and the original video frame 121 coming from the video conference client 101 to generate a shake detection result which carries as argument a displacement vector in two-dimensional image coordinates representing the camera shake direction and magnitude.

Although the principles underlying the present invention could be applied to three-dimensional camera shake detection, it is noticed that the shake detector 103 preferably only deals with camera shake movements along the X and Y axes of the image, i.e. in two dimensions, in order to simplify the camera shake correction algorithm and to increase the robustness and response time.

The shake detector 103 implements the following algorithm for determining the camera shake displacement vector. Starting from the current video frame $F_t$ and the previous video frame $F_{t-1}$, the sparse optic flow is computed using the Pyramidal Lukas-Kanade (LK) approach. In order to increase the reliability and accuracy of the optic flow estimation and to obtain a larger set of sparse features, the optic flow is calculated between the edge images $\nabla F_t$ and $\nabla F_{t-1}$ of the frames, obtained by applying the Canny operator. In order to eliminate spurious features, the resulting sparse feature set produced by the LK algorithm is filtered by imposing for each feature f the condition that the absolute frame difference in that point must exceed a given threshold $T_{diff}$:

$$|F_t(f)-F_{t-1}(f)|>T_{diff}$$

The result is a feature set φ which contains the sparse features along with their displacement vectors computed from one frame to another.

The foreground mask 122 generated by the cut-out module 102 is inverted by the shake detector 103 in order to obtain a background mask. This background mask is applied to the feature set φ in order to generate a subset of features φ that belongs to the image background. Thereafter, the shake detector 103 applies image statistics the subset of features φ in order to determine the global motion in the background in the form of a two dimensional vector 123 that is forwarded to the scene composer 104 and fed back to the cut-out module 102.

In order to consider only moving features due to the camera shaking, a threshold $T_v$ is applied to the magnitude of each feature's displacement. If the magnitude of the displacement of a feature is below the threshold Tv, it is considered as noise and will be eliminated as it will induce an error into the estimation of the global displacement vector.

Figure 2:
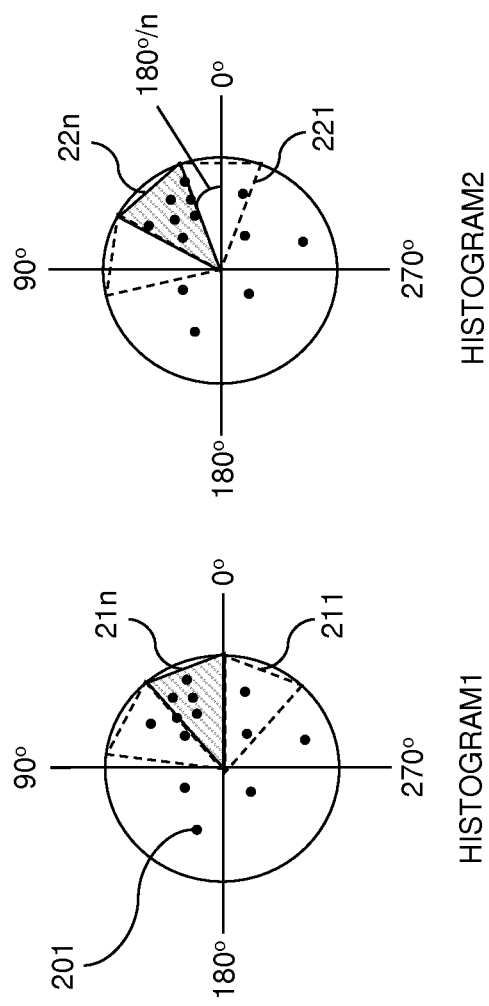
FIG. 2 illustrates the use of histograms for filtering the subset of features that will be used for camera shake determination in an embodiment of the present invention.

Furthermore, two histograms, HISTOGRAM1 and HISTOGRAM2 in FIG. 2, with n bins each are used to group the features according to their orientation. Each bin, i.e. 211 . . . 21N for HISTOGRAM1 and 221 . . . 22n for HISTOGRAM2, covers a range of 360°/n. The first histogram starts at 0° while the second histogram is rotated over an angle of 180°/n with respect to the first histogram. The features, e.g. 201 in FIG. 2, are all assigned to a bin in HISTOGRAM1 and a bin in HISTOGRAM2 according to the orientation of their individual displacement between two frames. The bin with the maximum number of features amongst both histograms is selected and all features that do not belong to this bin, are discarded from the global displacement calculation. In FIG. 2, the bin containing the largest number of features is 22n. This histogram based filtering of features ensures that spurious motion due to optic flow estimation errors is eliminated and the dominant direction is chosen. The use of two histograms, rotated with respect to one another, ensures that the dominant direction does not coincide with the border between two bins as a result of which the features displaced along this dominant direction would become spread over two bins and the algorithm looking for the bin with the largest amount of features could end up with an entirely different bin and erroneous dominant direction.

Thereafter, the shake detector 103 calculates the average orientation θ over the remaining features. The standard deviation of the orientation $\sigma_\theta$ makes it possible to estimate if this result can be used by the cutout algorithm to correct the camera shake effect in the extracted foreground image. If the standard deviation $\sigma_\theta$ is smaller than a predefined margin a $\sigma_{max}$, the displacement as a result of camera shake effects at the client is determined with sufficient accuracy. The average angle θ and the average magnitude of the feature displacements, then represents a two dimensional displacement vector that can reliably be used by the cut-out module to correct the camera shake effect in the foreground image that will be used in immersive video streams 125 generated by the scene composer 104 for other clients and in the immersive video stream 124 that will be generated by the scene composer 104 for the client 101 with shaking camera.

The shake detector 103 sends the displacement vector information 123 to the cut-out module 102. If the magnitude of the displacement vector exceeds an application threshold $T_{shake}$, corrective measures are applied in order to obtain a stable cut-out foreground mask. These corrective measures result in translating each pixel in the current foreground mask using a displacement of the same magnitude as the displacement vector but oriented in the opposite direction, i.e. θ+180°.

Figure 3:
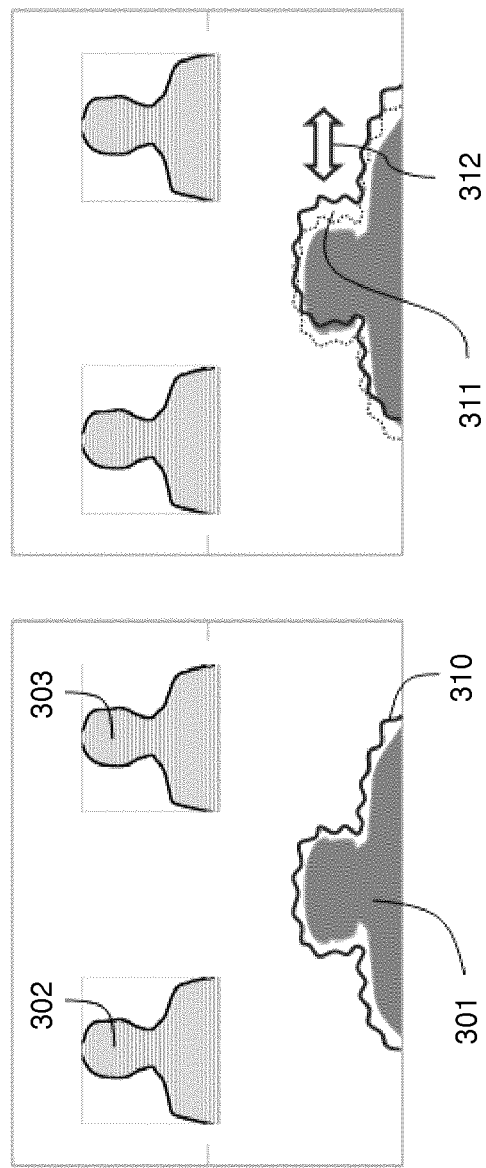
FIG. 3 illustrates the signalling of camera shake through a shake indication in an embodiment of the present invention.

In addition, the shake detector 103 also sends the displacement vector information 123 to the scene composer 104. The scene composer 104 is responsible for creating the immersive scene wherein the cut-out of each user is integrated in such manner that stimulates the feeling of natural interaction and sharing of a common virtual space. The scene is customized for each participant to the video conference. FIG. 3 for instance shows the scene from the perspective of a first participant, in which his own cut-out 301 appears as a shadow, with the cut-out 302 of a second participant and the cut-out 303 of a second participant facing him like in a natural conversation. The first participant may for instance be the user of video client 101 in FIG. 1.

Considering that camera shake has been detected for client 101, the scene composer 104 will insert a visual shake indicator 312 in FIG. 3 into the participant's shadow representation in order to signal the presence of the phenomenon. The shake indicator 312 is accompanied by a subtle wiggle effect 311 along the direction of the displacement vector of the participant's shadow border 310, in order to deliver the message to the user without having to resort to conventional dialog boxes or notification messages implemented client-side.

Additionally, the scene composer 104 applies the same translation as the cut-out module 102 to the video frame 121 before applying the corrected cut-out mask, in order to stabilize the cut-out of the participant. The advantage of this approach is that the scene composer 104 can be updated with new effects server-side, and these will be displayed by clients without them having to know how rendering must be performed. This allows for thin clients that require little processing power and can be hosted in for instance a browser.

The method according to the invention shall typically be computer-implemented on a data processing system or computing device under control by for instance a cloud service operator. A data processing system or computing device that is operated according to the present invention can include a workstation, a server, a laptop, a desktop, a hand-held device, a mobile device, a tablet computer, or other computing device, as would be understood by those of skill in the art.

The data processing system or computing device can include a bus or network for connectivity between several components, directly or indirectly, a memory or database, one or more processors, input/output ports, a power supply, etc. One of skill in the art will appreciate that the bus or network can include one or more busses, such as an address bus, a data bus, or any combination thereof, or can include one or more network links. One of skill in the art additionally will appreciate that, depending on the intended applications and uses of a particular embodiment, multiple of these components can be implemented by a single device. Similarly, in some instances, a single component can be implemented by multiple devices.

The data processing system or computing device can include or interact with a variety of computer-readable media holding a computer program that enables to execute the method according to the present invention. For example, computer-readable media can include Random Access Memory (RAM), Read Only Memory (ROM), Electronically Erasable Programmable Read Only Memory (EEPROM), flash memory or other memory technologies, CDROM, digital versatile disks (DVD) or other optical or holographic media, magnetic cassettes, magnetic tape, magnetic disk storage or other magnetic storage devices that can be used to encode information and can be accessed by the data processing system or computing device. The memory can include computer-storage media in the form of volatile and/or nonvolatile memory. The memory may be removable, non-removable, or any combination thereof. Exemplary hardware devices are devices such as hard drives, solid-state memory, optical-disc drives, or the like. The data processing system or computing device can include one or more processors that read data from components such as the memory, the various I/O components, etc.

Although the present invention has been illustrated by reference to specific embodiments, it will be apparent to those skilled in the art that the invention is not limited to the details of the foregoing illustrative embodiments, and that the present invention may be embodied with various changes and modifications without departing from the scope thereof. The present embodiments are therefore to be considered in all respects as illustrative and not restrictive, the scope of the invention being indicated by the appended claims rather than by the foregoing description, and all changes which come within the meaning and range of equivalency of the claims are therefore intended to be embraced therein. In other words, it is contemplated to cover any and all modifications, variations or equivalents that fall within the scope of the basic underlying principles and whose essential attributes are claimed in this patent application. It will furthermore be understood by the reader of this patent application that the words "comprising" or "comprise" do not exclude other elements or steps, that the words "a" or "an" do not exclude a plurality, and that a single element, such as a computer system, a processor, or another integrated unit may fulfil the functions of several means recited in the claims. Any reference signs in the claims shall not be construed as limiting the respective claims concerned. The terms "first", "second", "third", "a", "b", "c", and the like, when used in the description or in the claims are introduced to distinguish between similar elements or steps and are not necessarily describing a sequential or chronological order. Similarly, the terms "top", "bottom", "over", "under", and the like are introduced for descriptive purposes and not necessarily to denote relative positions. It is to be understood that the terms so used are interchangeable under appropriate circumstances and embodiments of the invention are capable of operating according to the present invention in other sequences, or in orientations different from the one(s) described or illustrated above.

The invention claimed is:

1. A video conferencing server for immersive video conferencing, said video conferencing server being adapted to receive and combine video streams captured by cameras of plural video clients and to generate immersive video streams for delivery to and play-out by said plural video clients,
   wherein said video conferencing server comprises:
   a cut-out module adapted to generate a foreground mask for a video frame received from a conferencing client;
   a camera shake detector adapted to determine a displacement vector for a subset of features in said video frame, said displacement vector representing a two-dimensional motion of said subset of features between a background mask obtained by inverting said foreground mask and a previous background mask generated for a previous video frame received from said conferencing client;

a camera shake correcting module adapted to apply a displacement opposite to said displacement vector to said foreground mask before use thereof in said immersive video streams to thereby correct camera shake effects of said conferencing client; and a signaling unit adapted to generate a shake indication into an immersive video stream delivered to said conferencing client.

2. A video conferencing server according to claim 1, wherein said camera shake detector comprises:

a video stream processor for selecting a set of features in said video frame and said previous video frame;

filtering logic for filtering said set of features to obtain a subset of features that belongs to said background mask of said video frame and to said previous background mask of said previous frame; and processing logic for computing a sparse optic flow for said subset of features through the Pyramidal Lukas-Kanade algorithm.

3. A video conferencing server according to claim 2, wherein said camera shake detector further comprises:

statistical logic for calculating from said sparse optical flow for said subset of features through statistical averaging a motion magnitude and motion direction that form said displacement vector.

4. A video conferencing server according to claim 2, wherein said camera shake detector further comprises:

processing logic configured to compare for each feature in said subset of features the magnitude of said sparse optical flow to a predetermined threshold, and configured to discard said feature from calculating said displacement vector when said magnitude of said sparse optical flow is below said predetermined threshold.

5. A video conferencing server according to claim 2, wherein said camera shake detector further comprises:

processing logic configured to assign each feature in said subset of features according to a direction of its sparse optical flow to a first bin out of a first set of n histogram bins each covering a range of 360 degrees/n and to a second bin out of a second set of n histogram bins each covering a range of 360 degrees/n, n being a positive integer value, and said second set of n bins being rotated over 180 degrees/n with respect to said first set of n bins;

processing logic configured to select a dominant bin amongst said first set of n bins and said second set of n bins, containing the highest amount of features from said subset of features; and processing logic configured to discard all features that do not belong to said dominant bin from calculating said displacement vector.

6. A method for camera shake detection in a video conferencing server being adapted to receive and combine video streams captured by cameras of plural video clients and to generate immersive video streams for delivery to and play-out by said plural video clients, wherein said method comprises:

generating a foreground mask for a video frame received from a conferencing client;

determining a displacement vector for a subset of features in said video frame, said displacement vector representing a two-dimensional motion of said subset of features between a background mask obtained by inverting said foreground mask and a previous background mask generated for a previous video frame received from said conferencing client;

applying a displacement opposite to said displacement vector to said foreground mask before use thereof in said immersive video streams to thereby correct camera shake effects of said conferencing client; and generating a shake indication into an immersive video stream delivered to said conferencing client.

7. A data processing system comprising means for carrying out the method of claim 6.

8. A computer program comprising software code adapted to perform the method of claim 6.

9. A computer non-transitory computer-readable storage medium comprising the computer program of claim 8.

* * * * *